Patented Feb. 8, 1938

2,107,712

UNITED STATES PATENT OFFICE 2,107,712

GUANIDINO AND BIGUANIDINO DERIVATIVES OF CYCLIC ETHER COMPOUNDS

Bruno Puetzer, Albany, N. Y., assignor to Winthrop Chemical Company, Inc., New York, N. Y., a corporation of New York No Drawing. Application June 7, 1934, Serial No. 729,478. In Germany June 9, 1933

7 Claims. (Cl. 260—125)

This invention relates to the manufacture of guanidino and biguanidino derivatives of ether compounds which are therapeutically valuable media.

In accordance with the present invention substances of a considerable action on bacteria and protozoa are obtainable in accordance with the methods hereinafter indicated by the manufacture of guanidino and biguanidino derivatives of ethers in which a six-membered nucleus is linked to a second at most bicyclic ring system by means of at most 2 ether-like bound oxygen or sulfur atoms. The six-membered nucleus mentioned above is preferably a nucleus of the benzene series, however, also hydrogenated benzene nuclei may be present in the new products. The other nucleus combined with the six-membered nucleus by at most two ether-like bound oxygen or sulfur atoms is likewise preferably a nucleus of the benzene series, but also in this case hydrogenated benzene nuclei furthermore bicyclic ring systems, such as naphthalene are suitable for the production of the new guanidino and biguanidino derivatives of the ether compounds. The cyclic radicals may be connected with one another by one oxygen or sulfur atom as, for example, in the diphenylene-ethers or -thioethers, or may be further combined by a second oxygen or sulfur atom as, for example, in the diphenylene-dioxides or -disulfides.

The nuclei of the new compounds may be further substituted by monovalent substituents, such as alkyl groups, for example, the methyl, ethyl, isopropyl and allyl group, and alkoxy groups of the same kind. Other substituents are, for instance, halogen atoms, preferably chlorine, bromine and iodine, the nitro group, alkylamino groups, and the like. It may be mentioned that also the guanidino or biguanidino radical may contain substituents, for instance, aminoalkyl or alkylaminoalkyl radicals and one of the nitrogen atoms of the guanidino or biguanidino radicals may be the member of a heterocyclic nucleus. One or more of the guanidino or biguanidino radicals may be present in the new compounds defined above.

In accordance with the present invention the new guanidino and biguanidino derivatives of the ethers specified are obtainable by reacting upon an amino substituted ether, in which a six-membered nucleus is linked to a second at most bicyclic ring system by means of at most two ether-like bound oxygen or sulfur atoms, with cyanamide or dicyandiamide in the presence of a solvent. The reaction performs in accordance with the following reaction scheme when using an amino substituted ether of the benzene series as the reacting component:

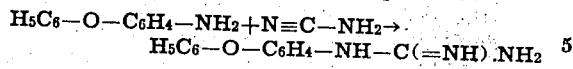

The biguanidino compound is formed in accordance with the following reaction scheme:

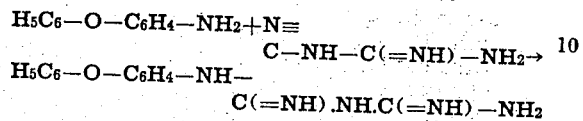

The reaction is preferably carried out with heating. Water or water-soluble alcohols are preferably used as solvents.

In further development of my present invention I have found that the new guanidino and biguanidino derivatives of the ethers specified are also obtainable by reacting upon the said amino substituted cyclic ethers with S-alkyl or S-arylalkyl-isothiourea ethers in which reaction the guanidino compound is formed while a mercaptane or arylmercaptane compound is split off. Similarly biguanidino compounds are obtainable in this manner by reacting upon N-guanyl substituted S-alkyl or S-arylalkyl-isothiourea ethers with the said amino substituted ethers. The reaction, for instance, performs in accordance with the following reaction scheme:

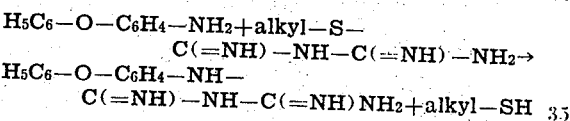

Alternatively the new products could be obtained by reacting upon a cyanamino compound of an ether as specified with ammonia, primary or secondary amines or guanidines, for instance, ammonia or amines are bound by a cyanamino-diphenylether while forming a corresponding guanidino-diphenylether whereas guanidine is bound by the said cyanamino-diphenylether while forming the corresponding biguanidino-diphenylether.

Furthermore, thiourea or guanyl thiourea derivatives of ethers may be reacted with ammonia, primary or secondary amines or guanidines in the presence of a condensing agent, such as metal compounds, for instance, lead hydroxide, in which case the corresponding guanyl or biguanyl compound is formed while hydrogen sulfide is split off, for instance, guanidinodiphenylether is obtained by reacting upon a thiourea diphenylether with ammonia in accordance with the following equation:

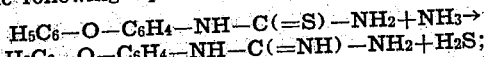

by reacting upon the same starting material with guanidine, biguanidino-diphenylether is obtained.

The guanidino or biguanidino derivatives of the ethers furthermore can be obtained by combining two cyclic components at least one of which contains the guanidino or biguanidino radical by means of an oxygen or sulfur atom, for instance, by reacting upon a guanidino or biguanidino phenolate or thiophenolate with a cyclic compound substituted by a reactive halogen atom, such as a nitro, -halogen, -benzene or -pyridine, or with an arylalkyl halide.

The valuable bactericidal properties of the new guanidino and biguanidino derivatives of the ethers specified obviously reside in the simultaneous presence of an ether-like linkage of two cyclic radicals, on the one hand, in the presence of at least one guanidino or biguanidino group attached to a nucleus, on the other hand, since guanidino compounds which do not contain the ether-like linkage between two cyclic radicals, do not show a considerable bactericidal action.

The invention is further illustrated by the following examples without being limited thereto:

Example 1.—3.6 grams of sodium cyanamide are suspended in 25 ccs. of alcohol and treated with 7.7 grams of concentrated hydrochloric acid while cooling. The sodium chloride which precipitates is sucked off and the filtrate after the addition of 12.5 grams of 4-amino-3',5'-dimethyldiphenyletherhydrochloride is heated in a bomb tube for 5 hours to 140-150° C. The alcohol is then evaporated in vacuo, the residue is dissolved in dilute hydrochloric acid and the solution which has been rendered alkaline is extracted with ether. The colorless crystals of the 4-guanidino-3',5'-dimethyldiphenylether which are obtained after drying the ethereal extract with potassium carbonate and evaporation of the ether melt at 161° C. on recrystallization from benzene-ligroin.

The same compound is obtained when treating 4-amino-3',5'-dimethyldiphenylether with S-ethylisothiourea-hydrobromide and decomposing the hydrobromide formed with alkali.

The same compound is obtained when starting with 4-cyanamino-3',5'-dimethyldiphenylether melting at 120° C. 6 grams of this compound are heated with 20 grams of 21% alcoholic ammonia in a closed vessel for 12 hours to 120° C. The solution is dried in vacuo, the residue is dissolved in dilute hydrochloric acid and treated in the manner described above.

The new compound can also be obtained when employing the 4-thiourea-3',5'-dimethyldiphenylether of the formula

melting at 151° C. as starting material. A solution of 9 grams of this substance is digested in 50 ccs. of methanol with excess lead hydroxide and 50 ccs. of alcoholic ammonia (21%). The solution is kept at ordinary temperature for some hours and then shortly heated to 40-60° C. The alcoholic solution is then sucked off from lead sulfide while hot and dried in vacuo. The residue is again heated with excess alcoholic ammonia to 120° C. for several hours in a closed vessel. The alcohol is evaporated in vacuo and the residue which is now soluble in acids is treated in the above described manner.

Example 2.—18.4 grams of 4-aminodiphenylether, 23 grams of hydrochloric acid (specific gravity 1.08) and 9 grams of dicyandiamide are heated to boiling for 20 minutes. The 4-biguanidinodiphenylether-hydrochloride forms whitish crystals when recrystallized from water which melt at 249° C.

20 grams of 4,4'-diaminodiphenylether, 46 grams of hydrochloric acid (spec. gravity 1.08) and 18 grams of dicyandiamide are heated to boiling for one hour. After cooling the mixture is diluted with water, rendered alkaline and the separating precipitate is recrystallized from methylalcohol. The 4,4'-bis-biguanidino-diphenylether forms whitish crystals which melt at 202° C.

In an analogous manner there are obtained in the form of whitish crystals 2-biguanidino-4'-methyl-diphenylether, melting at 158° C., 3-biguanidino-3',5'-dimethyldiphenylether melting at 119° C., 4-biguanidino-2'-methyldiphenylether, melting at 150° C., 4-biguanidino-4'-methyldiphenylether the hydrochloride of which melts at 242° C., 4-biguanidino-2,4'-dimethyldiphenylether melting at 149° C., 4-biguanidino-3',5'-dimethyldiphenylether melting at 181° C., (hydrochloride melting at 224° C.), 4-biguanidino-2,3',5'-trimethyldiphenylether melting at 145° C. (lactate melting at 87° C.), 4-biguanidino-4'-chlorodiphenylether (hydrochloride melting at 243° C.), 4-biguanidino-3'-chloro-4'-methyldiphenylether (hydrochloride melting at 202° C.), 4-biguanidino-2-chloro-3',5'-dimethyldiphenylether melting at 154° C. (lactate melting at 163° C.; dihydrochloride melting at 228° C.).

Example 3.—13 grams of 4-methylamino-3',5'-dimethyldiphenylether-hydrochloride, 25 ccs. of water and 4.5 grams of dicyandiamide are heated to boiling for one hour. The mixture is then rendered alkaline, extracted with ether and the ether residue is recrystallized from alcohol. The 4-α-methyl-biguanidino-3',5'-dimethyldiphenylether forms whitish crystals melting at 187° C.

In an analogous manner the 4-α-diethylaminoethylbiguanidino-3',5'-dimethyldiphenylether is obtained when starting with 4-diethylaminoethylamino-3',5'-dimethyldiphenylether-dihydrochloride. It forms whitish crystals melting at 142° C. Its complex copper salt forms raspberry colored crystals melting at 192° C.

Example 4.—15 grams of 4-amino-4'-chlorodiphenylsulfide, 65 ccs. of normal hydrochloric acid and 6.5 grams of dicyandiamide are heated to boiling for 2 hours. After cooling the hydrochloride which has precipitated is filtered with suction and decomposed with dilute caustic soda solution. The 4-biguanidino-4'-chlorodiphenylsulphide crystallizes from alcohol in whitish crystals melting at 157° C. The dihydrochloride melts at 230° C.

Example 5.—15 grams of 4-diethylaminoethylamino-diphenylsulfide, 23 grams of hydrochloric acid (spec. grav. 1.08) and 4.5 grams of dicyandiamide are heated to boiling for 2 hours. The aqueous solution is then rendered alkaline and extracted with ether. The 4-α-diethylaminoethylbiguanidino-diphenylsulfide is precipitated after drying and concentration of the ethereal extract by the addition of petroleum ether. It crystallizes from benzeneligroin in whitish crystals melting at 117° C.

Example 6.—22.9 grams of 4-aminobenzyl-para-toluylsulfide, 23 grams of hydrochloric acid (spec. grav. 1.08) and 9 grams of dicyandiamide are heated to boiling for one hour. After cooling the hydrochloride which has precipitated is filtered with suction, dissolved in water and the base precipitated by means of dilute caustic soda solution. The 4-biguanidinobenzyl-para-toluylsulfide crystallizes from alcohol in whitish crystals melting at 177° C.

I claim:—

1. The process which comprises reacting upon an amino-substituted ether in which a six-membered carbocyclic nucleus is linked to a second at most bicyclic ring system consisting of six-membered carbocyclic rings by means of an atom selected from the group consisting of oxygen and sulfur with an amide compound selected from the group consisting of cyanamide and dicyandiamide in the presence of an inert solvent.

2. The process which comprises reacting upon an amino-substituted ether in which a six-membered carbocyclic nucleus is linked to a second six-membered carbocyclic nucleus by means of an atom selected from the group consisting of oxygen and sulfur with an amide compound selected from the group consisting of cyanamide and dicyandiamide in the presence of an inert solvent.

3. The compounds of the formula:

$$R^1—X—R^2$$

wherein $R^1$ stands for a six-membered carbocyclic nucleus, $R^2$ stands for an at most bicyclic ring system consisting of six-membered carbocyclic rings, at least one of the said nuclei being substituted by a substituent selected from the group consisting of the guanidino, biguanidino and the corresponding N-alkylated groups, and wherein X stands for an atom selected from the group consisting of oxygen and sulfur, which products are in the form of the free bases insoluble in water but soluble in organic solvents and are soluble in water in the form of their salts.

4. The compounds of the formula:

$$R^1—X—R^2$$

wherein $R^1$ stands for a six-membered carbocyclic nucleus, $R^2$ stands for a six-membered carbocyclic nucleus, one of the said nuclei being substituted by a substituent selected from the group consisting of the guanidino, biguanidino and the corresponding N-alkylated groups, and wherein X stands for an atom selected from the group consisting of oxygen and sulfur, which products are in the form of the free bases insoluble in water but soluble in organic solvents and are soluble in water in the form of their salts.

5. Mono-biguanidino-diphenylethers, which products are in the form of the free bases insoluble in water, but soluble in organic solvents and are soluble in water in the form of their salts.

6. The process which comprises reacting upon an amino-diphenylether with an amide compound selected from the group consisting of cyanamide and dicyandiamide in the presence of an inert solvent.

7. The compounds of the formula:

$$R^1—X—R^2$$

wherein $R^1$ and $R^2$ stand for nuclei of the benzene series, one of the said nuclei being substituted by a substituent selected from the group consisting of the guanidino, biguanidino and the corresponding N-alkylated groups, and wherein X stands for an atom selected from the group consisting of oxygen and sulfur, which products are in the form of the free bases insoluble in water, but soluble in organic solvents and are soluble in water in the form of their salts.

BRUNO PUETZER.